US009057471B2

(12) United States Patent
Kokoski (10) Patent No.: US 9,057,471 B2
(45) Date of Patent: Jun. 16, 2015

(54) METHOD AND DEVICE FOR TAPPING AND TRACING A CONDUIT

(71) Applicant: Jameson LLC, Clover, SC (US)

(72) Inventor: Bradley Robert Kokoski, Fort Mill, SC (US)

(73) Assignee: JAMESON LLC, Clover, SC (US)

( * ) Notice: Subject to any disclaimer, the term of this patent is extended or adjusted under 35 U.S.C. 154(b) by 178 days.

(21) Appl. No.: 13/919,344

(22) Filed: Jun. 17, 2013

(65) Prior Publication Data

US 2014/0076414 A1 Mar. 20, 2014

Related U.S. Application Data

(63) Continuation-in-part of application No. 13/713,346, filed on Dec. 13, 2012.

(30) Foreign Application Priority Data

Sep. 20, 2012 (KR) .......................... 10-2012-0104447

(51) Int. Cl.
- *F16L 55/18* (2006.01)
- *F16L 41/04* (2006.01)
- *F16L 55/48* (2006.01)
- *F16L 1/11* (2006.01)
- *F16L 41/06* (2006.01)

(52) U.S. Cl.
CPC ................. *F16L 41/04* (2013.01); *F16L 55/48* (2013.01); *F16L 1/11* (2013.01); *F16L 41/06* (2013.01)

(58) Field of Classification Search
CPC ............. F16L 1/11; F16L 41/04; F16L 41/06; F16L 55/48
USPC .......................................................... 137/317
See application file for complete search history.

(56) References Cited

U.S. PATENT DOCUMENTS

| | | | |
|---|---|---|---|
| 3,911,750 A * | 10/1975 | Prasher | 73/866.5 |
| 3,937,245 A | 2/1976 | Christie | |
| 3,975,735 A | 8/1976 | McCullough | |
| 4,063,844 A | 12/1977 | Pessia | |
| 4,126,431 A | 11/1978 | Wolowski et al. | |
| 4,295,494 A | 10/1981 | McGowan et al. | |
| 4,350,177 A * | 9/1982 | Firchau et al. | 137/370 |
| 4,573,829 A | 3/1986 | Keene et al. | |
| 5,302,895 A | 4/1994 | Philpot | |
| 5,469,155 A * | 11/1995 | Archambeault et al. | 340/853.4 |
| 5,612,499 A | 3/1997 | Andrew et al. | |

(Continued)

OTHER PUBLICATIONS

PCT/US2013/056089 International Search Report and Written Opinion Dated Jan. 10, 2014.

*Primary Examiner* — Craig Schneider
*Assistant Examiner* — Kevin Barss
(74) *Attorney, Agent, or Firm* — Shumaker, Loop & Kendrick, LLP (57) ABSTRACT

Disclosed are a method and a device for tapping and tracing a conduit that is obstructed from view such as a subterranean pipe. The invention allows the conduit to be traced while the conduit continues to function. The device includes a tapping tee for tapping into a conduit with an entry port at an acute angle to the conduit, a flexible fiberglass rodder that includes a conductor, a stuffing box removably attached to the tapping tee for inserting the rodder into the tapping tee, a signal transmitter operably attached to the rodder, and a signal receiver that receives the signals transmitted by the transmitter through the rodder and through the obstruction.

5 Claims, 8 Drawing Sheets

(56) References Cited

U.S. PATENT DOCUMENTS

| | | | |
|---|---|---|---|
| 5,671,772 A * | 9/1997 | Bliss | 137/370 |
| 5,711,381 A * | 1/1998 | Archambeault et al. | 175/45 |
| 5,934,304 A | 8/1999 | Peterson et al. | |
| 6,019,351 A | 2/2000 | Allen | |
| 6,279,668 B1 * | 8/2001 | Mercer | 175/45 |
| 6,286,542 B1 | 9/2001 | Morain et al. | |
| 6,380,743 B1 | 4/2002 | Selvog | |
| 6,417,666 B1 * | 7/2002 | Mercer | 324/326 |
| 6,427,784 B1 * | 8/2002 | Archambeault et al. | 175/45 |
| 6,536,463 B1 | 3/2003 | Beals et al. | |
| 6,736,156 B2 | 5/2004 | Beals et al. | |
| 6,854,535 B1 * | 2/2005 | Mizuno | 175/62 |
| 7,579,962 B1 | 8/2009 | Eslambolchi et al. | |
| 7,721,754 B2 | 5/2010 | Knaus et al. | |
| 2002/0083976 A1 | 7/2002 | Beals et al. | |
| 2002/0114595 A1 | 8/2002 | Potash | |
| 2003/0068143 A1 | 4/2003 | Martinez et al. | |
| 2004/0118454 A1 * | 6/2004 | Leppert et al. | 137/318 |
| 2007/0051192 A1 * | 3/2007 | Penza et al. | 73/865.8 |
| 2008/0099077 A1 | 5/2008 | Knaus | |
| 2009/0050225 A1 | 2/2009 | Thomas | |
| 2009/0173397 A1 * | 7/2009 | Mallela et al. | 137/364 |
| 2009/0260695 A1 | 10/2009 | France et al. | |
| 2011/0206854 A1 | 8/2011 | O'Brien | |

* cited by examiner

METHOD AND DEVICE FOR TAPPING AND TRACING A CONDUIT

TECHNICAL FIELD AND BACKGROUND OF INVENTION

The present application is a continuation-in-part of, expressly incorporates by reference, and claims the benefit of and priority to co-pending U.S. Utility application Ser. No. 13/713,346 filed on Dec. 13, 2012. Both the present application and the '346 application claim the benefit of and priority to Korean Patent Application No. 10-2012-0104447 filed on Sep. 20, 2012, the entire contents of which are hereby expressly incorporated by reference.

TECHNICAL FIELD AND BACKGROUND OF INVENTION

The invention relates to the field of construction conduits. More particularly, the invention relates to the field of tracing ducts and piping such as in subterranean and hidden or difficult to reach locations.

Fluid carrying conduits make up a vital portion of modern mechanical systems. Piping conduits make possible the delivery of natural gas, water, and other liquids to residential and commercial construction and sewage piping carries away waste products from such systems. Additionally, conduits may be used to contain electrical and communications wiring. Ductwork can be used to deliver conditioned air to living environments and specialized piping can be used to circulate refrigerant and other chemicals in particular closed systems. Indeed, the industrial and manufacturing applicability of modern conduits is virtually boundless and includes various materials encompassing metals, polymers, ceramics, fibers, and other composites.

Such broad use and applicability of conduits and, in particular, piping has made their use so profligate that, in order that modern society not be visually and aesthetically completely overwhelmed with pipes, the pipes are very often concealed. Such concealment offers both aesthetic appeal and also protection from the environment. For instance, pipes may be buried underground, hidden within a wall, or located under a floor or above a ceiling. Pipes may also be encased within various types of insulation, housings, and other coverings.

However, despite the need to conceal and protect pipes, it is often the case that pipes require maintenance. Similarly, it is often the case that the structures around pipes may require maintenance or other construction and in such situations it is desirable to know where the piping is located so that the pipes are not negatively impacted. For all of these reasons, locating the pathway of pipes can be both a critical and a difficult task. Often times, the fluid flow through the pipes must be stopped and large portions of the pipes excavated in order to determine where the pipes are located. Such stoppages in flow and excavations can be quite costly and time consuming.

Thus, there is a need in the art to easily and quickly locate and trace the path of a pipe while at the same time being minimally invasive to both the pipe and the surrounding environment.

SUMMARY OF THE INVENTION

It is therefore an object of the present invention to provide a method and device for tapping and tracing the pathway of a conduit.

It is a further object of the present invention to provide a method and device that allows an existing network of conduit such as underground pipe to be tapped and traced without the need to excavate the pipe or to first clear the pipe of its contents. That is, the conduit may remain online and in full service while the conduit is being traced via the present invention.

It is a further object of the present invention to provide the ability to locate a distinct point along the path of the pipe in addition to the continuous length. This point location ability may be beneficial in locating blockages or junctions within a conduit.

These and other objects and advantages of the invention are achieved by providing a tapping-tee that facilitates a connection to the existing pipe, a traceable rodder for tracing the path of a pipe, and a stuffing box for inserting the rodder into the tapping-tee. The tapping tee has a saddle, a tee, and an open port. The open port may be considered as a branch pipe from the main pipe or conduit. The stuffing box includes an orifice through which the traceable rodder passes. The stuffing box is designed to removably attach to the open port of the tapping-tee. The stuffing box allows the traceable rodder to enter the tapping-tee and thus the pipe while at the same time preventing the fluid contained within the pipe from escaping or otherwise leaking into the environment via the orifice. The stuffing box includes a lubrication port for applying a lubricant to the traceable rodder. The stuffing box may also include a shutoff valve on the end that connects to the open port.

According to one embodiment of the invention, the device for tapping and accessing a buried pressurized conduit includes a tapping tee assembly that is operatively connected to the conduit. The assembly has a saddle for attaching to the conduit, a tee carried by the saddle defining a pathway into the conduit, and a port for permitting access to the conduit via the pathway. The device also includes a stuffing box defining a void having an entrance and exit, and a lubrication port for dispensing lubrication into the void. The device includes a connection between the stuffing box and the tapping tee assembly that connects the exit of the stuffing box to the port of the tapping tee assembly. The device further includes a flexible rodder adapted to be received into and through the void and into the conduit in a pressure-tight sealing state for maintaining pressurization in the conduit during tapping, and for receiving lubrication from the lubrication port sufficient to permit movement of the rodder through the void and into and out of the conduit.

The position of the rodder inside of the stuffing box is an important aspect of the invention. The diameter of the rodder is only slightly smaller than the diameter of the void of the stuffing box. The respective diameters are so close, in fact, that the rodder may require the lubrication to enter the stuffing box. The lubrication may be provided by way of the lubrication port or via pre-saturated wipes. Because the rodder fits so tightly within the stuffing box, a pressure-tight sealing state is maintained. The pressure-tight sealing may be aided by the inclusion of an o-ring fitting within a cavity within the stuffing box. The depth and diameter of the cavity is specially sized to accommodate the o-ring and optimize sealing. The o-ring may be made of a high-durability natural gum rubber. The o-ring utilizes a precise compression force that optimizes sealing effectiveness with minimal friction to allow the rodder to slip past an interior diameter of the o-ring. This pressure-tight sealing state secures any fluid contents of the conduit and tapping tee assembly and keeps the fluid from escaping through the stuffing box and into the surrounding environment. Thus, the rodder and stuffing box maintain a pressure-tight sealing state while at the same time the rodder is able to move through the entrance and exit of the stuffing box in order to operate within the tapping tee and conduit.

According to one embodiment, the device for tapping and tracing a buried conduit includes a tapping tee assembly that may be operatively connected to the conduit. The tapping tee assembly may include a saddle, a tee, and a port. The saddle may be attached to the conduit. The tee may be positioned at an angle that is approximately 90 degrees to the saddle and the tee may penetrate and open a pathway into the conduit. The port may be positioned at an acute angle to the conduit and to the tee in a plane defined by the tee and the conduit. The port permits access to the conduit via the pathway created by the tee. The device also includes a stuffing box which has an entrance end, an exit end, an inner housing defining a hollow void extending from the entrance end to the exit end, an outer housing surrounding the inner housing, and a lubrication port located proximate the entrance end. The device may also include a connection between the stuffing box and the tapping tee assembly that connects the exit end of the stuffing box to the port of the tapping tee assembly. The device further includes a flexible rodder which may have an internal conductor, a fiberglass rod covering the internal conductor, and a plastic sheath covering the fiberglass rod. The device may further include a signal transmitter which is operably connected to the internal conductor of the flexible rodder. The signal transmitter may be capable of transmitting a signal in the form of a pulse of electric current through the length of the flexible rodder. Finally, the device may further include a receiving antenna for receiving and detecting the signal transmitted by the signal transmitter through the flexible rodder.

According to another embodiment of the invention, the stuffing box is attached directly to the port.

According to another embodiment of the invention, the stuffing box includes a shut-off valve located proximate the exit end.

According to another embodiment of the invention, the lubrication port of the stuffing box may include a lubricant reservoir, a lubricant valve, and a cap.

According to another embodiment of the invention, the saddle and the port are made from a polymer and the saddle is electro-fusible to the conduit.

According to another embodiment of the invention, the saddle and the port are mechanically attached to the conduit. Mechanical attachment may be preferable in some situations where natural-gas is carried in conduits or where water is carried in conduit.

According to another embodiment of the invention, the connection between the stuffing box and the tapping tee also includes a short piece of polymeric conduit attached to the exit end of the stuffing box and a coupler which may be electro-fused to the short piece of pipe and to the port of the tapping tee.

According to another embodiment of the invention, the lubricant applied to the lubrication port is a lubricant that is applied to the rodder via the reservoir when the rodder is being extracted from the stuffing box. The invention may also include a plurality of pre-saturated wipes containing a water based lubricant (or other lubricant) for manually lubricating the rodder as it is inserted into the stuffing box. In such an embodiment, a human may manually apply the lubricant with the pre-saturated wipes.

According to another embodiment of the invention, the invention may also include a reel for holding and storing the flexible rodder.

According to another embodiment of the invention, the signal transmitter may include an output lead and a ground lead attached to a ground stake inserted into soil surrounding the buried cable. In such an embodiment, the internal conductor of the flexible rodder is a single conductor and also includes a first end comprising an external conductive fitting that is inserted into the stuffing box and a second end comprising an external conductive fitting that is connected to the output lead of the signal transmitter.

According to another embodiment, the signal transmitter may include a first output lead and a second output lead. In such an embodiment, the internal conductor of the flexible rodder is a dual conductor may also include a first conductor having an external fitting operably attached to the first output lead of the signal transmitter. The internal conductor may further include a second conductor comprising an external fitting operably attached to the second output lead of the signal transmitter. The internal conductor may further include a coil that splices the first conductor and the second conductor together at an end opposite the respective external fittings and that coils around the axis of the rodder.

According to another embodiment of the invention, the internal conductor of the flexible rodder is a single conductor and terminated in a threaded fitting wherein a flexible spring-loaded leader can be attached. The coil formed by the flexible spring leader is oriented so that the coils are concentric with the axis of the rod. The pulses of applied current from the transmitter are carried along internal conductors and into the spring leader. The coils of the spring leader reorient the electromagnetic field to be at 90 degrees from the field generated by the conductor within the flexible rodder. This new field orientation allows the user to turn the receiver antenna 90 degrees to isolate this unique signal thus pinpointing the exact tip of the rod instead of the continuous length.

According to another embodiment of the invention, the rodder includes a detachable passive marker attached to the tip of the rodder. The detachable passive marker is detachable from the rodder and includes a copper coil which is coiled around a ferrite core with an integrated capacitor. The detachable passive marker is encased in a protective plastic shell. The detachable passive marker may be attached via a threaded connection to the tip of the rodder.

According to another embodiment of the invention, the traceable rodder may be inserted through the orifice of the stuffing box, through the open port of the tapping-tee, through the opening created by the tee of the tapping-tee, through the saddle of the tapping-tee, and into the pipe. The length of the traceable rodder may vary depending on the application and pipe to be traced. As such, the traceable rodder may be several feet long or several hundred yards long or more or anywhere in between depending on the particular application. The traceable rodder may include a continuous, flexible fiberglass rod which is spooled for storage and transport on a circular reel. The outer surface of the fiberglass rod may be coated with a plastic sheath to allow it to be handled safely. The traceable rodder has at least two embodiments including one embodiment using a single internal conductor integrated into the center core of the rodder and another embodiment using dual insulated internal conductors integrated into the center core of the rodder.

According to an embodiment using the single conductor, the internal conductor is attached via an external fitting to a signal transmitter at the reel end of the rodder. The signal transmitter is also attached to a ground stake inserted into the surrounding soil. At the end of the rodder which is inserted into the stuffing box, the internal conductor is attached to an external fitting. This arrangement creates a continuous conductive path from one external fitting to another along the length of the rodder. In operation, the transmitter applies a pulse of electric current that travels along the length of the conductor within the rodder. This current generates an electromagnetic field that radiates outwardly from the rodder. This electromagnetic signal may then be detected by use of a receiving antenna from above ground. The antenna allows the user to identify the path of the fiberglass rod and thus the buried utility.

According to the embodiment using the dual conductor, each of the internal conductors is secured individually to its own external conductive fitting at the reel end. These fittings are then attached to a transmitter. At the end of the rodder which is inserted into the stuffing box, the internal conductors are coiled around the axis of the rodder and are spliced together. This arrangement creates a continuous conductive path from one terminal to the other. This also creates an amplified transmitting beacon at the tip of the rodder where the conductor is coiled around the rod axis. In an alternate embodiment, the signal of the transmitting beacon can be further strengthened by use of a carefully selected capacitor installed in series with the coil. The value of the capacitor and the number of coils of the wire can be optimized to provide a signal with the highest amplitude allowing the beacon to be detectable at greater depths. In operation, the path may be traced just as with the embodiment using the single conductor. However, to locate only the tip of the rodder, the output and ground leads from the transmitter are attached to each.

According to another embodiment of the invention, the device may further include a stab plug for disconnecting the stuffing box and for cutting and sealing off the short piece of polymeric conduit after the conduit has been tapped and traced.

According to another embodiment of the invention, the connection between the stuffing box and the tapping tee may include a shutoff valve fixedly attached to the port of the tapping tee and removably attached to the stuffing box.

According to another embodiment of the invention, the rodder is engraved via laser with indicia which relate to numerical values, such as footage, so that a user can determine how far into a section of conduit the rodder has been inserted. In addition, when retracting the rodder, the user can determine when the tip of the rodder has cleared the valve section so it may be closed and not damage the rodder. Laser engraving is preferable to mechanical stamping because the rodder can be deformed during the stamping which may cause fluids within the conduit to escape when the markings pass through the o-ring of the stuffing box.

According to another embodiment of the invention, an additional 45 degree fitting may be attached to the open port portion of the tapping tee. Such a fitting will angle the tapping tee portion upward towards a grade surface.

According to another embodiment of the invention, a gripping puck may be utilized when the rodder is being retracted. A gripping puck is a handheld rubberized puck with a shallow groove along the centerline. The groove allows the puck to be folded along the rod to improve grip during pulling of the rodder from the conduit and the tapping tee.

According to one embodiment, the invention is a method of method of tapping and tracing a buried conduit. The first step of the method includes determining the location of an entrance point into a polymeric conduit to be traced. The second step of the method includes providing a tapping tee capable of being electro-fused to and creating an opening into the polymeric conduit and further including a single open port fixed at an acute angle relative to the polymeric conduit and having a shut-off valve. This second step also includes providing a stuffing box having an inner housing with an open cylindrical void and a lubrication port. This second step also includes providing a signal transmitter operably tied to a traceable rodder and a signal receiving antenna. A third step of the method includes electro-fusing the tapping tee to the conduit. A fourth step of the method includes attaching the stuffing box to the open port with the shutoff in a closed position. A fifth step of the method includes actuating the tapping thereby creating the opening into the conduit. A sixth step of the method includes inserting the rodder into the inner housing of the stuffing box. A seventh step of the method includes opening the shutoff valve and inserting the rodder through the shutoff valve, into the tapping tee, and into the conduit. An eight step of the method includes operating the signal transmitter. A ninth step of the method includes moving the signal receiving antenna over a section of ground thereby tracing the conduit. A tenth step of the method includes deactivating the signal transmitter. A final step includes removing the rodder from the conduit and shutting off the valve of the stuffing box after the rodder exits the valve but before the rodder completely exits the stuffing box housing.

According another embodiment of the invention, an additional final step includes sealing off the single open port and removing the stuffing box.

According to another embodiment of the invention, the single open is port sealed with a stab plug.

According to another embodiment of the invention, the second step further includes providing a plurality of pre-saturated wipes and the seventh step further includes wiping the rodder with the pre-saturated lubricant wipes as the rodder is inserted into the stuffing box.

According to another embodiment of the method, a further step includes installing an extension portion of pipe which brings the tapping tee to near grade level and installing a permanent valve box at grade which protects the assembly and affords access to the tapping tee assembly for future use. Such a valve box may extend from the surface grade to buried conduit. At the base of the valve box near the conduit, the valve box may have a dome base. The valve box may be made of metal and include a metal lid with appropriate markings to indicate the presence of the tapping tee. Such markings may state "Gas Insertion Locating Tee."

BRIEF DESCRIPTION OF THE DRAWINGS FIGURES

Features, aspects, and advantages of a preferred embodiment of the invention are better understood when the detailed description is read with reference to the accompanying drawings, in which:

FIG. 3 is a perspective view of the assembled device with the twin conductor rodder inserted and passing through;

FIG. 4 is an exploded view of the device showing the twin conductor rodder inserted and passing through;

FIG. 5 is a is a perspective view of the stuffing box with the rodder passing through;

FIG. 6 is a is a side view of the stuffing box with the rodder passing through;

FIG. 7 is a cross-sectional view of the stuffing box with the rodder passing through;

DETAILED DESCRIPTION

It is to be understood by a person having ordinary skill in the art that the present discussion is a description of exemplary embodiments only and is not intended as limiting the broader aspects of the present invention. The following example is provided to further illustrate the invention and is not to be construed to unduly limit the scope of the invention.

Figure 1:
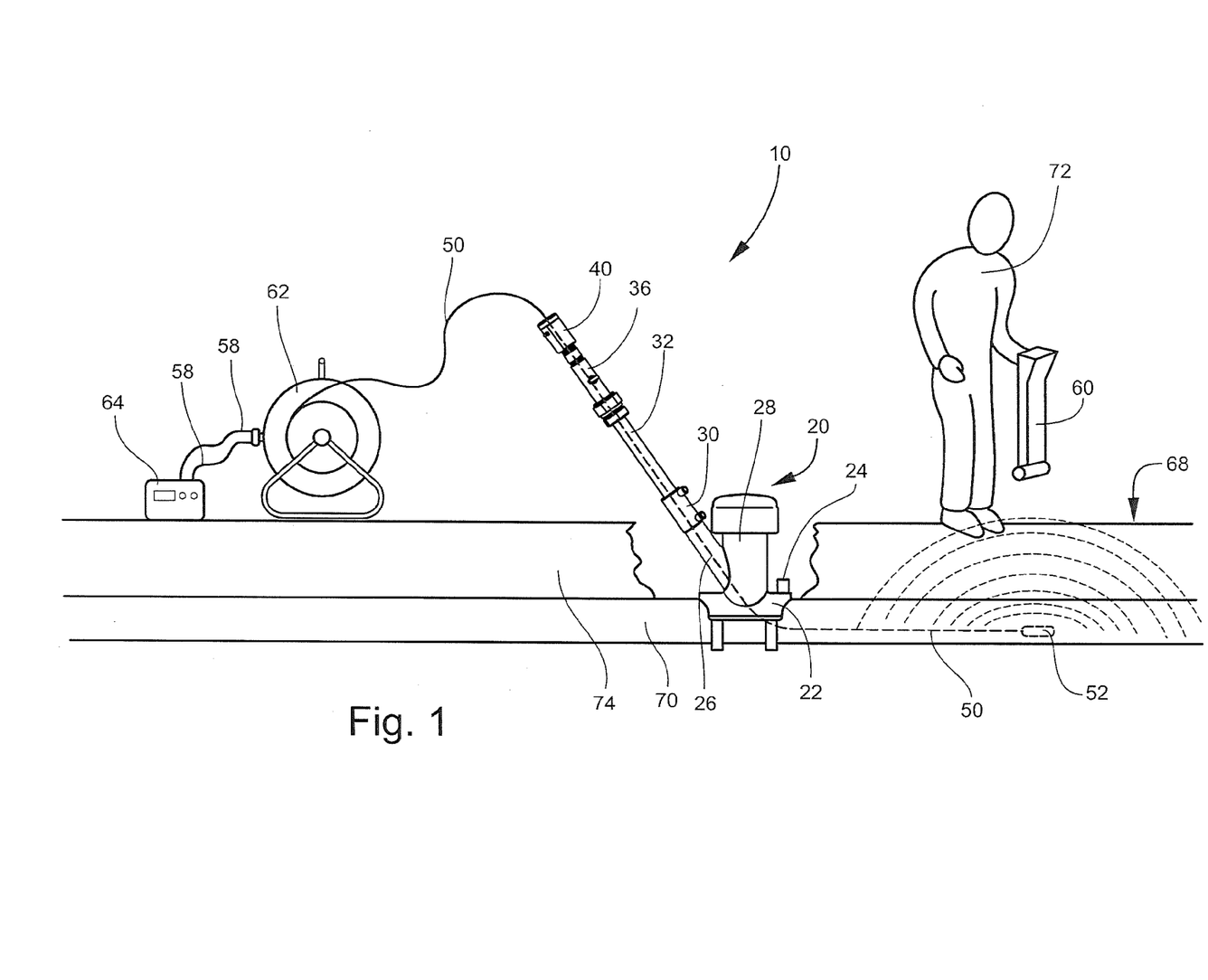
FIG. 1 is a side environmental view of the device installed on a subterranean conduit where an operator is utilizing the embodiment having twin conductors to trace the conduit.

Referring to FIG. 1, the invention 10 allows for a subterranean conduit 70 to be traced while the pipe 70 remains in full operation. The invention 10 includes a tapping-tee 20, a traceable rodder 50, a stuffing box 40, a quantity of lubrication contained in a lubrication port 42, an antenna 60, a signal transmitter 64, and a conductor tip 52. The invention may further include a rodder storage reel 64.

Figure 3:
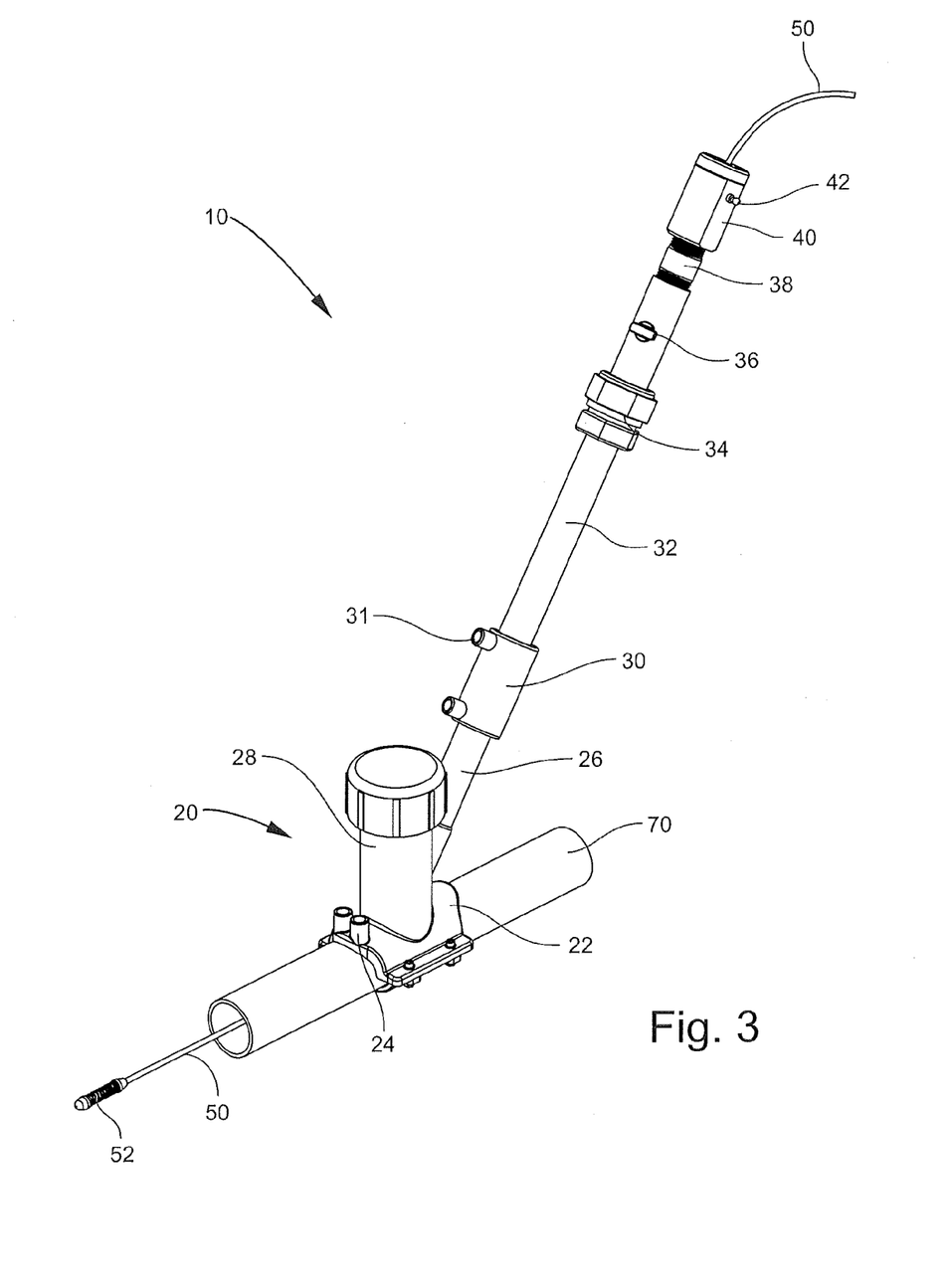
Figure 4:
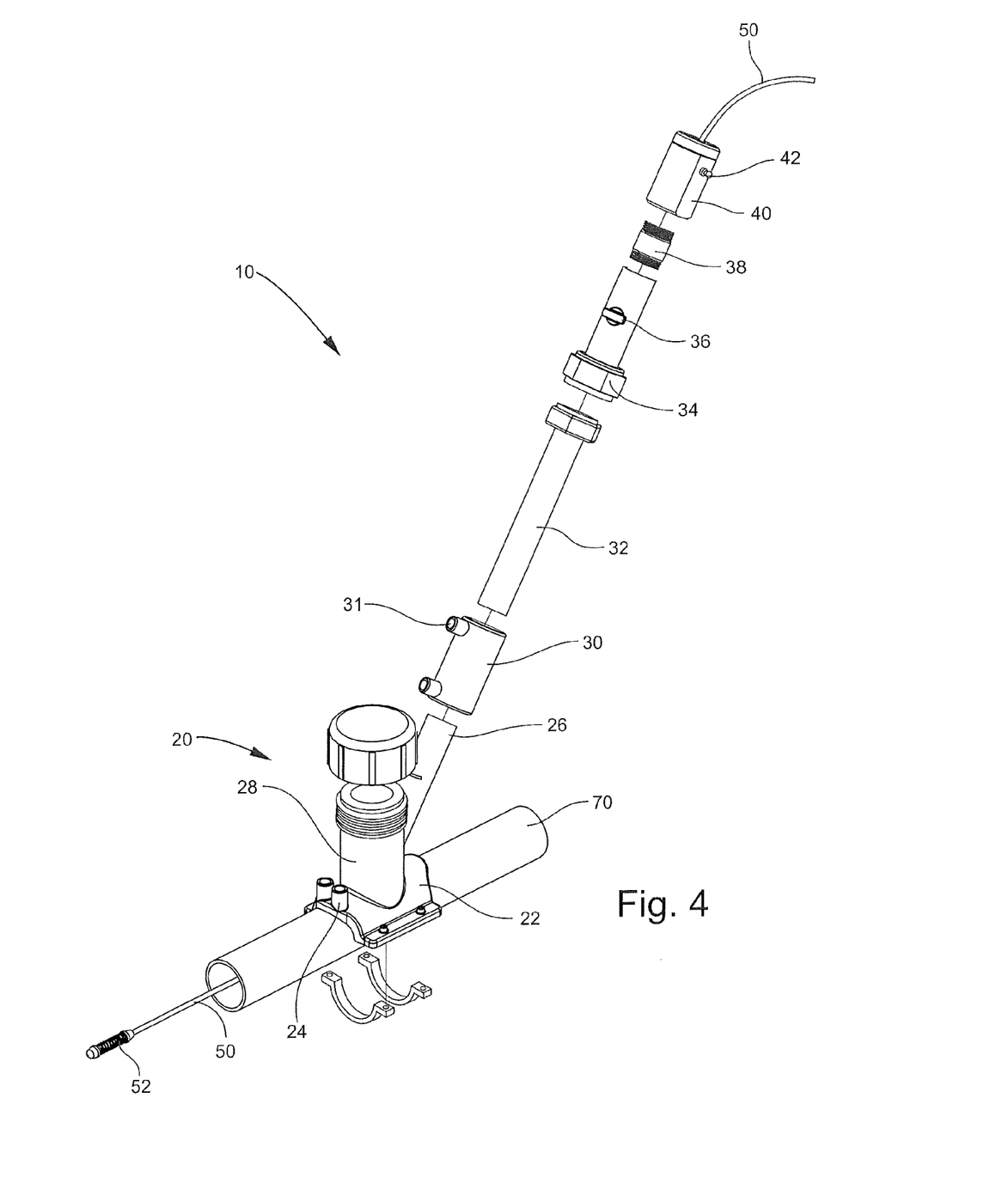

The tapping-tee 20 facilitates the connection of the invention 10 to conduit 70. Referring to FIG. 3 and FIG. 4, the tapping-tee 20 includes a saddle portion 22, a tee portion 28, and an open port portion 26. The tapping-tee 20 may be made of a polymer. The saddle portion 22 of the tapping-tee 20 has a semi-cylindrical shape that corresponds to the curvature and the shape of the pipe 70 to which the tapping-tee 20 is being attached. The saddle portion 22 is designed to fixedly attach to a portion of pipe 70 via electro fusion. As such, the saddle portion 22 further includes at least two electro fusion contacts 24 for connection to an electro fusion welder.

In an alternative embodiment, the saddle portion 22 may utilize a mechanical attachment means 25 in place of or, alternatively, in addition to the two electro fusion contacts 24. The mechanical attachment means 25 may include a mechanical clamp or similar device that sufficiently attaches and seals the saddle portion 22 to the conduit 70.

Figure 2:
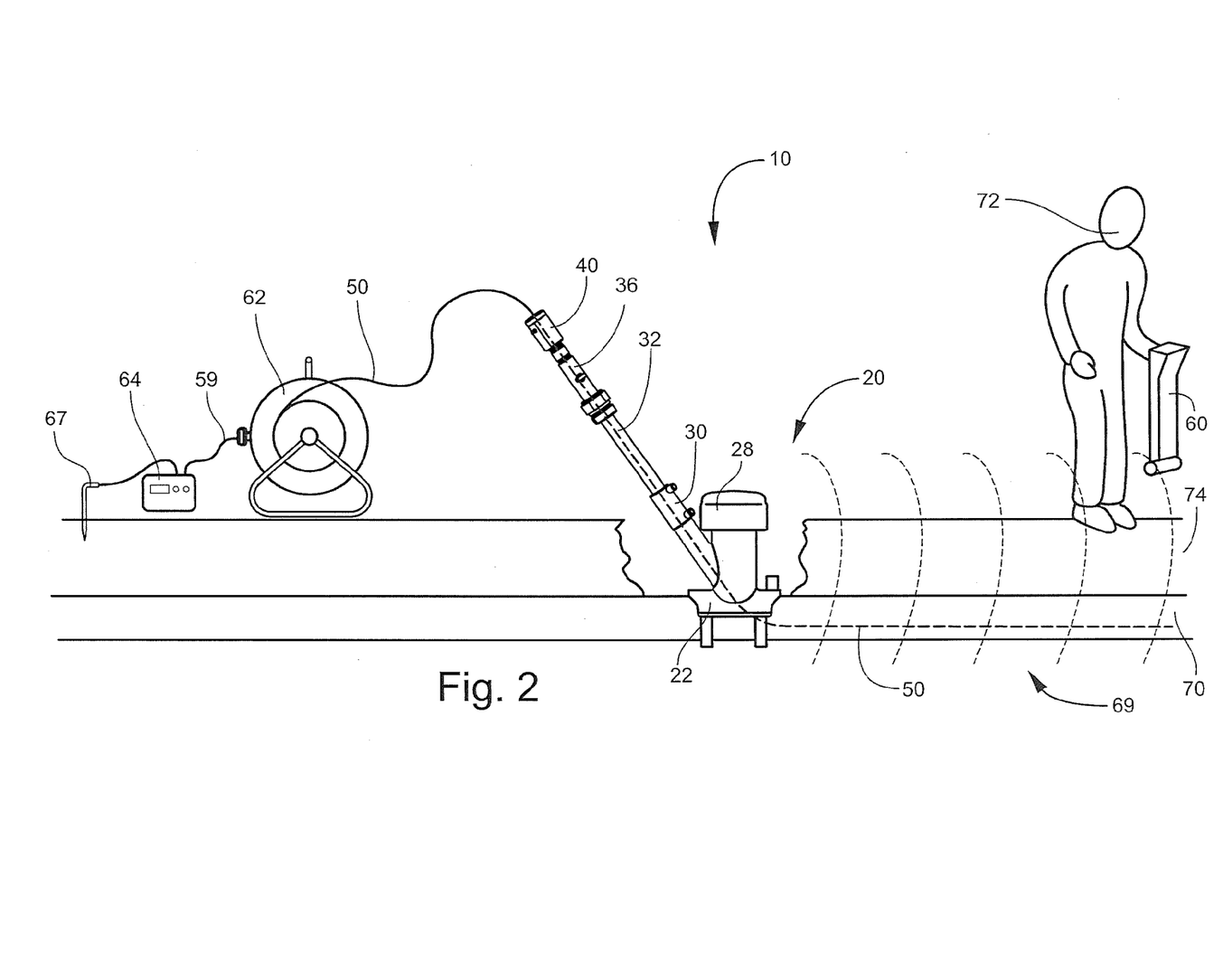
FIG. 2 is a side environmental view of the device installed on a subterranean conduit where an operator is utilizing the embodiment having a single conductor to trace the conduit.

The tee portion 28 of the tapping-tee is attached to the saddle portion 22. The attachment of the tee portion 28 is at an angle that is 90 degrees relative to the section of pipe 70 to which the saddle 22 is to be attached. Referring to FIG. 1 and FIG. 2, the open port portion 26 is attached to the tee portion 28 and is at an angle less than 90 degrees relative to the pipe 70 to which the saddle 22 is to be attached. The open port portion 26 is cylindrical in shape and is located in the plane defined by the tee portion 22 and the pipe 70. The tee portion 28 is cylindrical in shape and includes an inner portion and an outer portion. The outer portion houses the inner portion. The inner portion functions to pierce the pipe 70 and to create a pathway through which the rodder 50 may enter the pipe 70. When actuated, though the contents of the pipe 70 may in a particular application flow through the open port portion 26, the contents may not escape through the tee portion 28. Further, the tee portion 28, once actuated, is fixed and sealed.

The stuffing box 40 is attached to the open port portion 26 of the tapping-tee 20 via a coupler 30 and pipe connection 32. The coupler 30 is cylindrical and has an inside diameter slightly larger than the open port portion 26 of the tapping-tee 20. The coupler 30 is attached to the open port portion 26 via an electro fusion connection and is also attached to a smaller section of pipe 32 via an electro fusion connection. The outside diameter of the smaller section of pipe 32 is slightly smaller than the inside diameter of the coupler 30. As such, the coupler 30 will have at least two electro fusion contacts 31 for connection to the open port 26 and to the small section of pipe 32, Referring to FIGS. 3-7, the stuffing box 40 connects to the small section of pipe 32 and facilitates the insertion of the rodder 50 which has a substantially cylindrical shape. The connection of the stuffing box 40 to the small section of pipe 32 may be via a threaded connection 34 or via a crimp-fitting connection. The stuffing box 40 comprises a shut-off valve 36, a substantially cylindrical outer housing 44, a cylindrical inner housing 46, and a lubrication port 42. The shut-off valve 36 is detachable. The shut-off 36 may be threadingly attached 38 to the stuffing box 40 outer housing 44. The shut-off 36 is attached to the connector 34 that attaches to the small section of pipe 32. The shut-off valve 36 operates from a closed position where the small section of pipe 32 is sealed to an open position where the rodder 50 may enter the small section of pipe 32.

Figure 5:
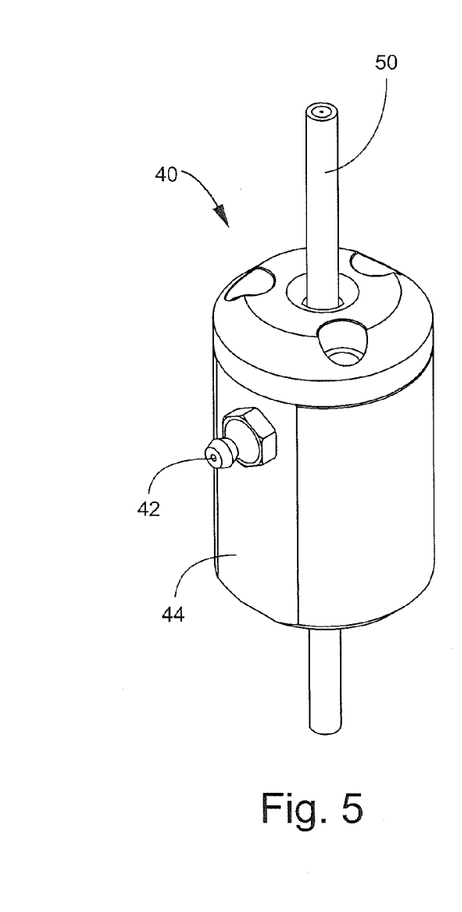
Figure 6:
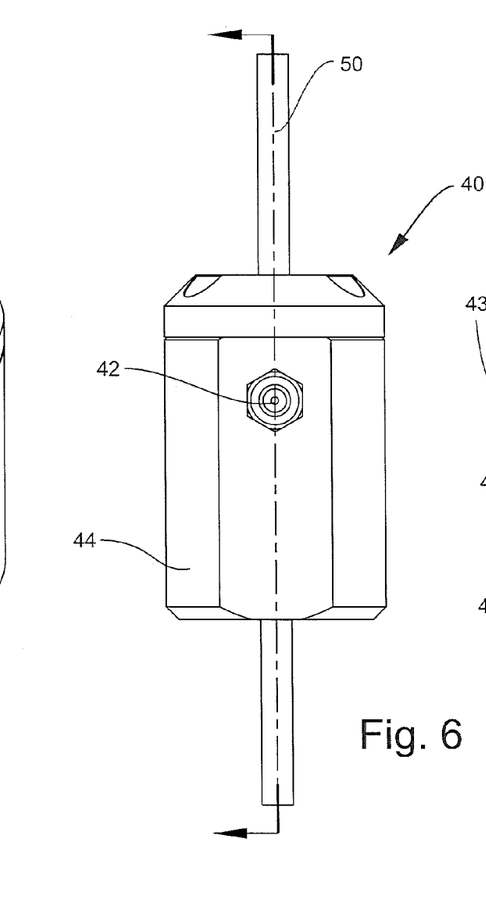
Figure 7:
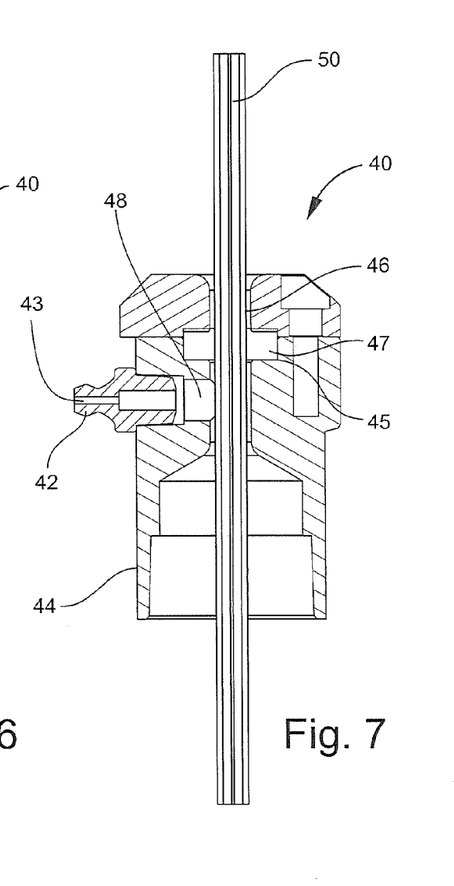

Referring to FIGS. 5, 6, and 7, the lubrication port 42 is designed to lubricate the rodder 50 when it is being extracted from the conduit 70 and through the stuffing box 40 after use. The lubrication port 42, similar in construction to a traditional grease fitting, includes an opening 43 and a cap located on the outside of the outer housing 44 of the stuffing box 40 and an inner reservoir 48 that provides lubrication through the inner housing 46 of the stuffing box 40 to the rodder 50. The inner housing 46 of the stuffing box 40 fits inside the outer housing 44 and has an inner diameter only slightly larger than the diameter of the rodder 50. The stuffing box 40 includes an o-ring cavity 45 which houses an o-ring 47. The o-ring cavity 45 is a hollow and cylindrical and has a diameter sized with respect to the o-ring 47 so that optimal pressure is applied to seal the contents of the stuffing box when the rodder 50 is inserted yet also reduce friction between the rodder 50 and the o-ring 47.

Figure 8:
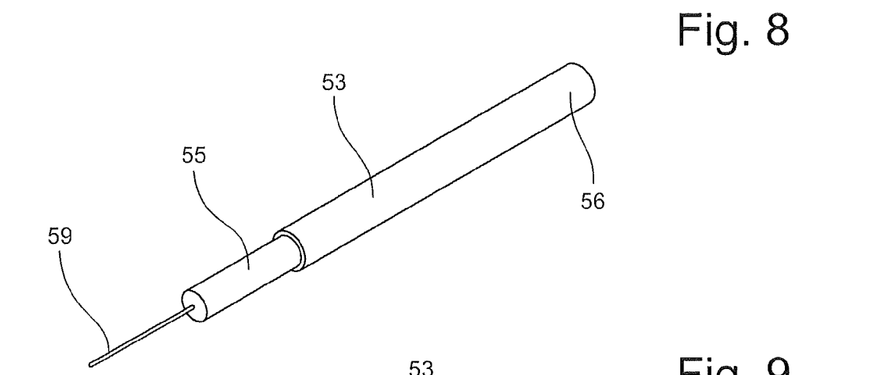
FIG. 8 is a perspective view of the rodder tip having a single conductor integrated into the center.
Figures 9, 10:
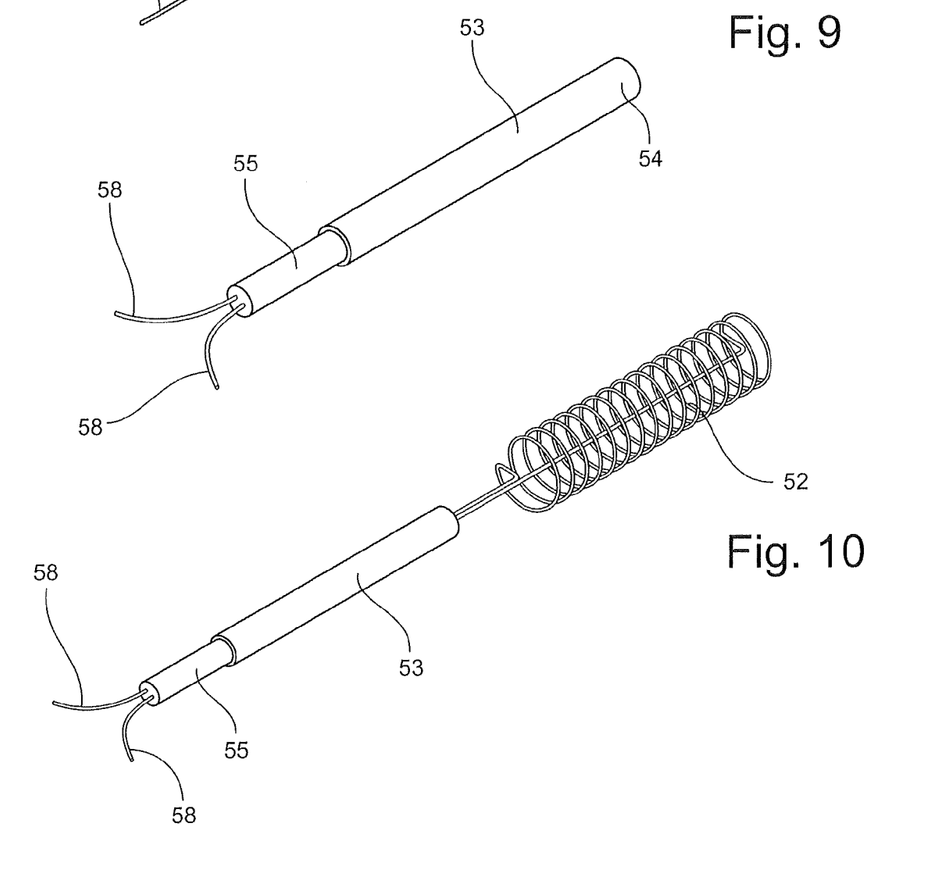
FIG. 9 is a perspective view of the rodder tip having a twin conductor integrated into the center.
FIG. 10 is a perspective view of the rodder tip having a twin conductor integrated into the center and having the conductor coiled at the tip.

Referring to FIGS. 1, 2, and 8-10, the traceable rodder 50 is a continuous, flexible fiberglass rod 55 having one or more internal electrical conductors 58, 59 located in its core. The rodder 50 may be stored on a circular storage reel 62, The rodder 50 may have a plastic covering 53 as an outer layer over the fiberglass 55. The electrical conductor(s) 58, 59 may include one 59 or two 58 conductors. FIG. 8 shows the embodiment having one conductor 58 and FIGS. 9 and 10 show embodiments having two conductors 58. Similarly, FIG. 1 shows the environmental view of an implementation of the embodiment using two twin conductors 58 and FIG. 2 shows the environmental view of tan implantation of the embodiment using a single conductor 59. As shown in FIG. 1, the In the embodiment having twin conductors 58, as shown in FIGS. 1, 9, and 10, each one of the twin conductors 58 is individually attached to its own conductive fitting which is attached to the signal transmitter 64. The terminals of the twin conductors 58 may also be attached to the storage reel 62 which may then be attached to the signal transmitter 64. At the end of the rodder 50 opposite the transmitter 64 and reel 62, the twin conductors 58 are spliced together to form a transmitting tip 52. Transmitting tip 52 is protected by protective jacket 54, 56. This transmitting tip 52, releases a transmitting beacon 68 which is received by a receiving antenna 60 at the point of tip 52. In the embodiment shown in FIG. 10, the twin conductors 58 are coiled around the axis of the rodder to form the transmitting tip 52. The transmitting beacon signal 68 can be further strengthened by the use of a carefully selected capacitor installed in series with the coil transmitting tip 52. The value of the capacitor and the number of coils of the tip 52 can be optimized to provide a signal with the highest amplitude, allowing the transmitting beacon signal 68 to be detectable by the antenna 60 at greater depths.

Figures 11, 12, 13:
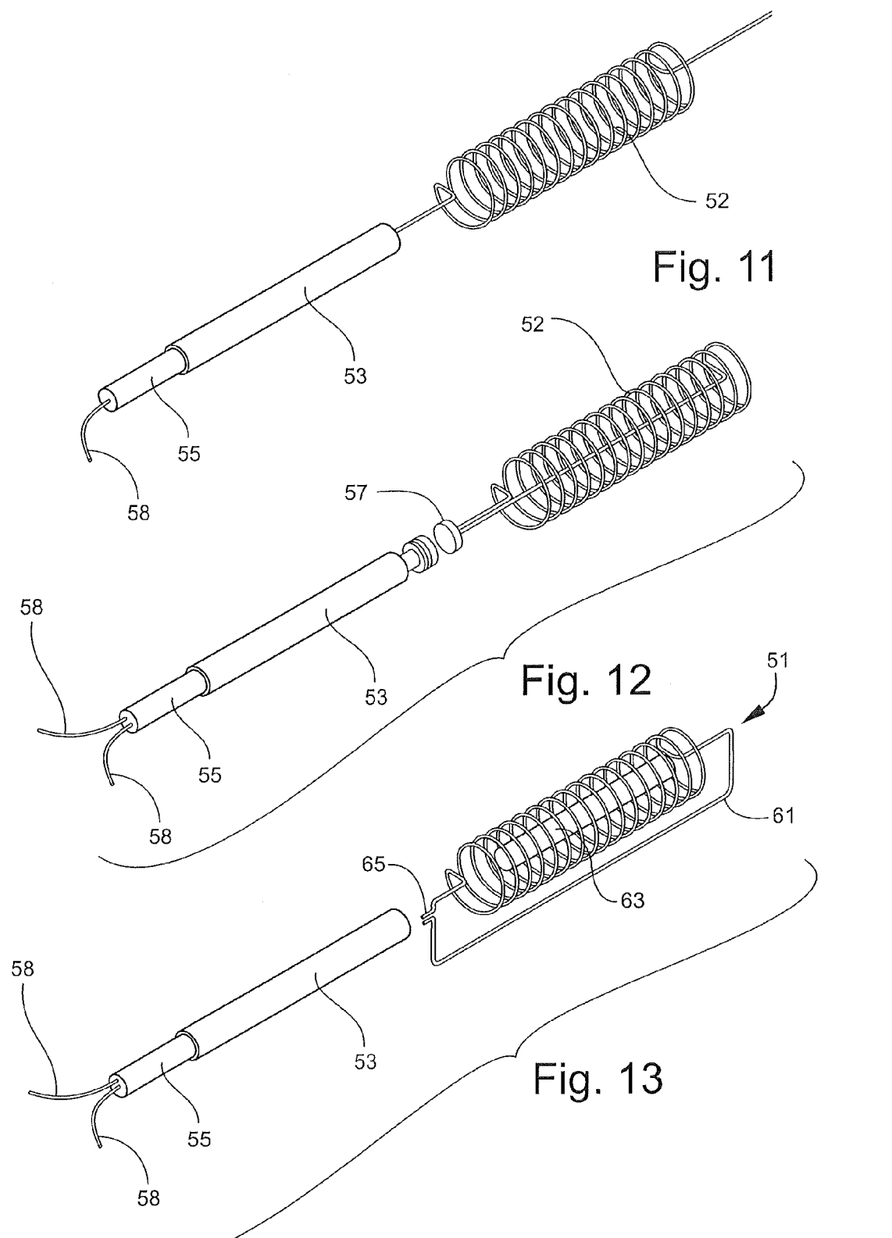
FIG. 11 is a perspective view of the rodder tip having a single conductor and a spring tip
FIG. 12 is a perspective view of the rodder tip showing the detachable tip.
FIG. 13 is a perspective view of the rodder tip showing the copper coil coiled around a ferrite core.

In the embodiment having a single conductor 59, as shown in FIGS. 2, 8, and 11, the conductors 59 is attached to a conductive fitting which is attached to the signal transmitter 64. The terminal may also be attached to the storage reel 62 which may then be attached to the signal transmitter 64. Additionally, a ground lead is attached to a ground stake 67 inserted into the surrounding soil 74. At the end of the rodder 50 opposite the transmitter 64 and reel 62, the single conductor includes a transmitting tip 52. This transmitting tip 52 protected, by protective jacket 56, releases a transmitting beacon 69 along the path of the conduit 70 which is received by a receiving antenna 60. The signal transmitter 64 applies a pulse of electric current that travels along the length of the conductor 59 within the fiberglass rod 55 which is covered by plastic 53. The current generates an electromagnetic field that radiates outwardly as a beacon 69. The antenna 60 allows the user 70 to identify the path of the rodder 50 through the conduit 70 under the soil 74.

Referring to FIGS. 11-12, in an alternate embodiment of the invention, the coiled tip 52 may be detachable at a detachment point 57. Further, the rodder may include a detachable passive marker 51. The detachable passive marker 51 is detachable from the rodder and includes a copper coil 61 which is coiled around a ferrite core 63 with an integrated capacitor. The detachable passive marker 51 may be encased in a protective plastic shell. The detachable passive marker may be attached via a connection 65 which may be a threaded connection (not shown) to the tip of the rodder.

Practicing the method of the invention as shown in FIG. 1, the soil 74 covering a section of conduit 70 is removed to allow access from the surface to the conduit 70. The saddle 22 of the tapping tee 20 is attached to the conduit 70 using the electro fusion contacts 24. The coupler 30 is attached open port 26 of the tapping tee 20 and the short pipe 32 using electro fusion contacts 31. The stuffing box 40 and shutoff valve 36 is attached to the short pipe 32 by threaded connection 34. The shutoff valve 36 is secured in the closed position. The tee portion 28 of the tapping tee 20 is actuated to pierce into the conduit 70. The rodder 50 is then inserted into the stuffing box 40 and the shutoff valve 36 is opened to allow the rodder to enter the tapping tee 20 and then the conduit 70. As the rodder 50 enters the conduit 70, the rodder 50 is unspooled from the reel 62. To trace the path of the conduit 70, the signal transmitter 64 is attached to the twin conductors 58 terminals at the rodder 50 end nearest to the reel 62. If the continuous path is of the conduit is to be traced, a ground stake 67 (as shown in FIG. 2) attached to a ground lead is inserted into the surrounding soil 74 and the path is traced. To locate only the tip 52 of the rodder 55, the twin conductors 58 are attached to the signal transmitter 64 but the ground stake 67 is not used. This allows the electromagnetic signal beacon 68 to radiate from the coil 58 only, allowing the user 72 to pinpoint an exact location (as shown in FIG. 1) by use of a locating antenna 60 from above ground. Because the electric current flows down the length of the rodder 50 to the coil 52, and then returns back along the rodder 50 in the opposite direction, the electromagnetic signals in the twin conductors 58 cancel each other out, and only the coil 52 at the tip of the rodder 50 is detectable by the antenna 60.

Continuing practicing the method, once the conduit 70 has been traced and/or the particular points within the conduit 70 located, the rodder 50 is withdrawn from the conduit 70. As the rodder 50 passes out of the shutoff valve 36, the shutoff valve 36 is moved to the closed position. The rodder 50 is then extracted from the stuffing box 40. As the rodder 50 is extracted from the conduit 70, from the tapping tee 20, and from the stuffing box 40, it is lubricated with lubricant via the lubrication reservoir 46 of the lubrication port 42 of the stuffing box 40. As the rodder 50 exits the stuffing box 40, it is wound onto the storage reel 62 for later use.

After the rodder 50 has been completely removed from the stuffing box 40, the stuffing box may be removed from the shutoff valve 36. Alternatively, the short pipe may be sealed with a stab plug (not shown), or other sealant mechanism available in the art, to permanently seal the tapping tee 20 and the conduit 70 to which the tapping tee 20 is attached.

Figure 14:
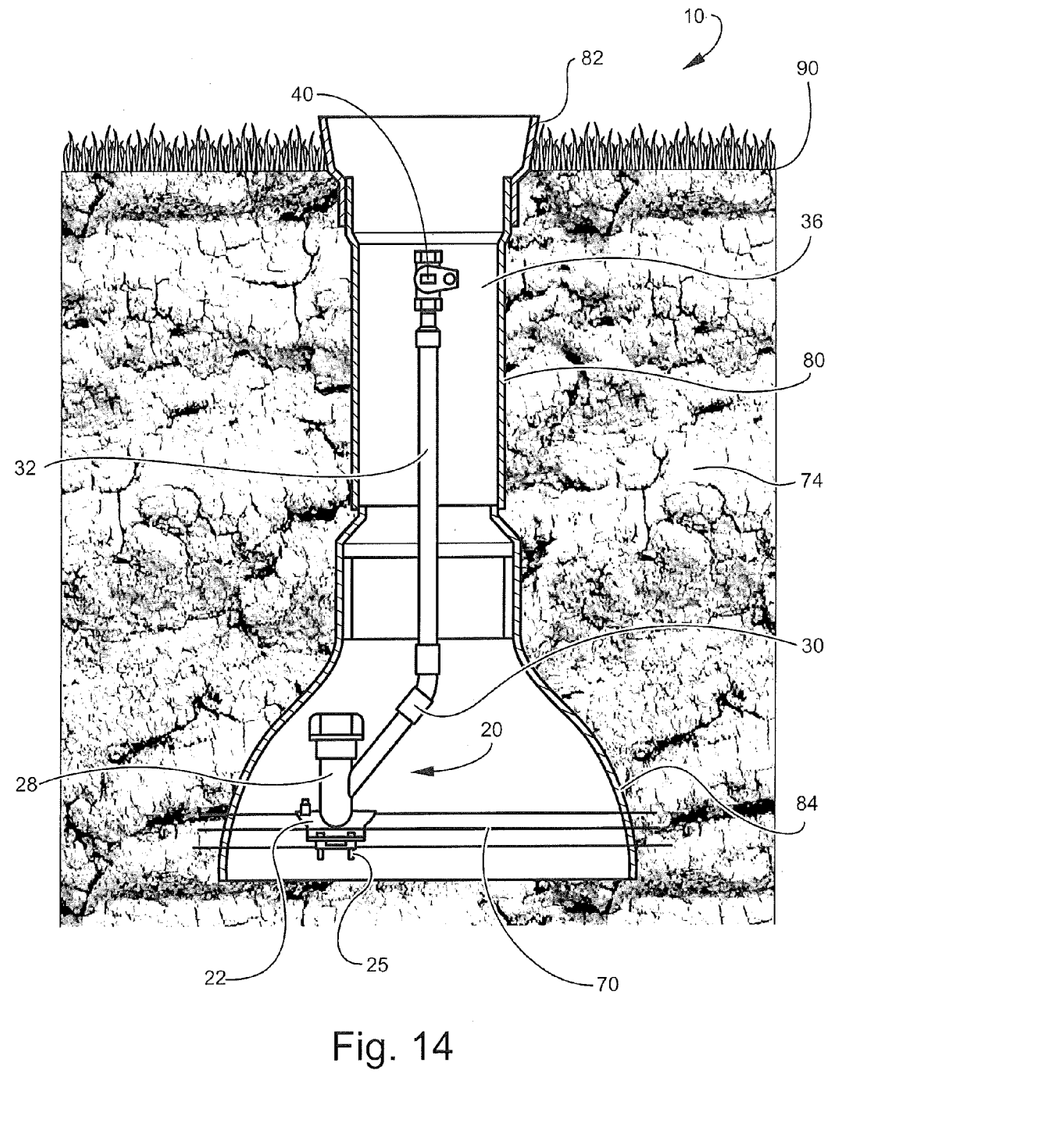
FIG. 14 is a cutaway environmental side view of the buried device.

Alternatively, an extension portion of pipe may be installed which brings the tapping tee to near grade level 90. Such an extension may utilize an angled connector piece of pipe such as an elbow at a 45 degree angle. Such an alternative includes the installation of a permanent valve box 80 extending to grade 90 which protects the assembly and affords access to the tapping tee assembly 20 and valve for future use. Such a valve box 80 may extend from the surface grade 90 to buried conduit 70. At the base of the valve box 80 near the conduit 70, the valve box 80 may have a dome base 84. The valve box 80 may be made of metal and include a metal lid 82 with appropriate markings to indicate the presence of the tapping tee. Such markings may state "Gas Insertion Locating Tee."

A method and device 10 for tapping and tracing a conduit 70 according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. A device for tapping and accessing a buried pressurized conduit comprising:
   a. a tapping tee assembly for being operatively connected to the conduit, and including an attachment to the conduit, a pathway into the conduit, and a port for permitting access to the conduit via the pathway;
   b. a stuffing box defining a void having an entrance and exit, an o-ring fitting tightly within an o-ring cavity, and a lubrication port for dispensing lubrication into the void, wherein the lubrication port further comprises a lubricant reservoir, a lubricant valve, and a cap and the stuffing box has an outer housing surrounding an inner housing which defines the hollow void;
   c. a connection between the stuffing box and the tapping assembly that connects the exit of the stuffing box to the port of the tapping assembly;
   d. a flexible rodder comprising an internal conductor, a fiberglass rod covering the internal conductor, and a plastic sheath covering the fiberglass rod and adapted to be received into and through the void and into the conduit in a pressure-tight sealing state for maintaining pressurization in the conduit during tapping, and for receiving lubrication from the lubrication port sufficient to permit movement of the rodder through the void and into and out of the conduit;
   e. a signal transmitter operably connected to the internal conductor of the flexible rodder and capable of transmitting a signal in the form of a pulse of electric current through the length of the flexible rodder; and f. a receiving antenna for receiving and detecting the signal transmitted by the signal transmitter through the flexible rodder.

2. A device for tapping and accessing a buried pressurized conduit comprising:
   a. a tapping assembly for being operatively connected to the conduit, and including an attachment to the conduit, a pathway into the conduit, and a port for permitting access to the conduit via the pathway;
   b. a stuffing box defining a void having an entrance and exit, an o-ring fitting tightly within an o-ring cavity, a shut-off valve located proximate the exit, and a lubrication port for dispensing lubrication into the void;
   c. a connection between the stuffing box and the tapping assembly that connects the exit of the stuffing box to the port of the tapping assembly;
   d. a flexible rodder comprising an internal conductor, a fiberglass rod covering the internal conductor, and a plastic sheath covering the fiberglass rod and adapted to be received into and through the void and into the conduit in a pressure-tight sealing state for maintaining pressurization in the conduit during tapping, and for receiving lubrication from the lubrication port sufficient to permit movement of the rodder through the void and into and out of the conduit;
   e. a signal transmitter operably connected to the internal conductor of the flexible rodder and capable of transmitting a signal in the form of a pulse of electric current through the length of the flexible rodder;
   f. a receiving antenna for receiving and detecting the signal transmitted by the signal transmitter through the flexible rodder; and
   g. wherein the lubricant applied to the lubrication port is a lubricant that is applied to the rodder via the reservoir when the rodder is being extracted from the stuffing box and wherein the device further comprises a plurality of pre-saturated wipes containing a lubricant for manually lubricating the rodder as it is inserted into the stuffing box.

3. A device for tapping and accessing a buried pressurized conduit comprising:
   a. a tapping assembly for being operatively connected to the conduit, and including an attachment to the conduit, a pathway into the conduit, and a port for permitting access to the conduit via the pathway;
   b. a stuffing box defining a void having an entrance and exit, an o-ring fitting tightly within an o-ring cavity, a shut-off valve located proximate the exit, and a lubrication port for dispensing lubrication into the void;
   c. a connection between the stuffing box and the tapping assembly that connects the exit of the stuffing box to the port of the tapping assembly;
   d. a flexible rodder comprising an internal conductor, a fiberglass rod covering the internal conductor, and a plastic sheath covering the fiberglass rod and adapted to be received into and through the void and into the conduit in a pressure-tight sealing state for maintaining pressurization in the conduit during tapping, and for receiving lubrication from the lubrication port sufficient to permit movement of the rodder through the void and into and out of the conduit;
   e. signal transmitter operably connected to the internal conductor of the flexible rodder and capable of transmitting a signal in the form of a pulse of electric current through the length of the flexible rodder;
   f. a receiving antenna for receiving and detecting the signal transmitted by the signal transmitter through the flexible rodder; and
   g. wherein the signal transmitter further comprises an output lead and a ground lead attached to a ground stake inserted into soil surrounding the buried cable, and the internal conductor of the flexible rodder is a single conductor and further comprises a first comprising an external conductive fitting that is inserted into the stuffing box and a second comprising an external conductive fitting that is connected to the output lead of the signal transmitter.

4. A device for tapping and accessing a buried pressurized conduit comprising:
   a. a tapping assembly for being operatively connected to the conduit, and including an attachment to the conduit, a pathway into the conduit, and a port for permitting access to the conduit via the pathway;
   b. a stuffing box defining a void having an entrance and exit, an o-ring fitting tightly within an o-ring cavity, a shut-off valve located proximate the exit, and a lubrication port for dispensing lubrication into the void;
   c. a connection between the stuffing box and the tapping assembly that connects the exit of the stuffing box to the port of the tapping assembly;
   d. a flexible rodder comprising an internal conductor, a fiberglass rod covering the internal conductor, and a plastic sheath covering the fiberglass rod and adapted to be received into and through the void and into the conduit in a pressure-tight sealing state for maintaining pressurization in the conduit during tapping, and for receiving lubrication from the lubrication port sufficient to permit movement of the rodder through the void and into and out of the conduit;
   e. signal transmitter operably connected to the internal conductor of the flexible rodder and capable of transmitting a signal in the form of a pulse of electric current through the length of the flexible rodder;
   f. a receiving antenna for receiving and detecting the signal transmitted by the signal transmitter through the flexible rodder; and
   g. wherein the signal transmitter further comprises a first output lead and a second output lead and wherein the internal conductor of the flexible rodder is a dual conductor further comprising:
      a. a first conductor comprising an external fitting operably attached to the first output lead of the signal transmitter;
      b. a second conductor comprising an external fitting operably attached to the second output lead of the signal transmitter; and
      c. a coil that splices the first conductor and the second conductor together at an end opposite the respective external fittings and that coils around the axis of the rodder.

5. A device for tapping and accessing a buried pressurized conduit comprising:
   a. a tapping assembly for being operatively connected to the conduit, and including an attachment to the conduit, a pathway into the conduit, and a port for permitting access to the conduit via the pathway;
   b. a stuffing box defining a void having an entrance and exit, an o-ring fitting tightly within an o-ring cavity, a shut-off valve located proximate the exit, and a lubrication port for dispensing lubrication into the void;
   c. a connection between the stuffing box and the tapping assembly, that connects the exit of the stuffing box to the port of the tapping assembly, and comprises a short piece of polymeric conduit attached to the exit of the stuffing box and a coupler electro-fused to the short piece of pipe and to the port of the tapping assembly;

d. a flexible rodder comprising an internal conductor, a fiberglass rod covering the internal conductor, and a plastic sheath covering the fiberglass rod and adapted to be received into and through the void and into the conduit in a pressure-tight sealing state for maintaining pressurization in the conduit during tapping, and for receiving lubrication from the lubrication port sufficient to permit movement of the rodder through the void and into and out of the conduit;

e. a signal transmitter operably connected to the internal conductor of the flexible rodder and capable of transmitting a signal in the form of a pulse of electric current through the length of the flexible rodder;

f. a receiving antenna for receiving and detecting the signal transmitted by the signal transmitter through the flexible rodder;

g. a stab plug for disconnecting the stuffing box and for cutting and sealing off the short piece of polymeric conduit after the conduit has been tapped and traced; and h. wherein the port is positioned at an acute angle to the conduit, the port of tapping assembly is made from a polymer, and the attachment to the conduit of the tapping assembly is electro-fused to the conduit.

\* \* \* \* \*